(12) United States Patent
Smiley

(10) Patent No.: US 7,160,054 B2
(45) Date of Patent: Jan. 9, 2007

(54) EXPANDING WEED INHIBITOR

(76) Inventor: Gary LeRoy Smiley, 2360 S. 60 E., Idaho Falls, ID (US) 83406

( * ) Notice: Subject to any disclaimer, the term of this patent is extended or adjusted under 35 U.S.C. 154(b) by 0 days.

(21) Appl. No.: 10/960,355

(22) Filed: Oct. 6, 2004

(65) Prior Publication Data

US 2006/0072968 A1    Apr. 6, 2006

(51) Int. Cl.
*A01G 9/00* (2006.01)
(52) U.S. Cl. ............... 404/35; 47/29.5; 47/32
(58) Field of Classification Search ............... 47/29.5, 47/29.7, 32; 404/35, 41; 405/302.4
See application file for complete search history.

(56) References Cited

U.S. PATENT DOCUMENTS

| | | | | |
|---|---|---|---|---|
| 915,897 | A * | 3/1909 | Skorness | 47/32 |
| 2,102,748 | A * | 12/1937 | Rocquin | 47/1.01 R |
| 2,549,006 | A * | 4/1951 | Propst | 428/27 |
| 3,305,969 | A | 2/1967 | Mattson | |
| 4,226,048 | A * | 10/1980 | Molnar | 47/81 |
| 4,268,992 | A | 5/1981 | Scharf, Sr. | |
| 4,308,688 | A | 1/1982 | Revane | |
| 4,413,588 | A * | 11/1983 | Lindholm | 119/760 |
| 4,648,203 | A | 3/1987 | Worzek | |
| 5,085,001 | A | 2/1992 | Crawley | |
| 5,279,069 | A * | 1/1994 | Myer | 47/32 |
| 5,323,557 | A | 6/1994 | Sonntag | |
| 5,361,536 | A * | 11/1994 | Myer | 47/58.1 R |
| 5,396,731 | A | 3/1995 | Byrne | |
| 5,430,971 | A * | 7/1995 | Myer | 47/32 |
| D369,123 | S * | 4/1996 | D'Alessandro | D11/148 |
| 5,522,176 | A | 6/1996 | Suttle | |
| 6,276,869 | B1 | 8/2001 | Yakushinji | |
| 6,527,255 | B1 * | 3/2003 | O'Berry et al. | 256/1 |
| 6,705,044 | B1 | 3/2004 | Clancey | |

* cited by examiner

*Primary Examiner*—Gary S. Hartmann
(74) *Attorney, Agent, or Firm*—Banner & Witcoff, Ltd.; Robert S. Katz; Chunhsi Andy Mu

(57) ABSTRACT

An expanding grass or weed inhibitor around a growing tree or shrub trunk with a series of overlapping, semi-circular wings (16) attached to the base (10), rotating via multiple pivot bolts (18). With an expanding trunk (14) diameter, the pressure of the trunk forces the semi-circular winds to move away from the trunk. Due to the overlapping of the semi-circular wings, their mutually-applied pressure blocks sturdier grass or weeds from uplifting the wings (16) or permeating the base (10). Along the perimeter of the base (10), a barrier wall (12) prevents the semi-circular wings from rotating too far respective to the trunk (14). For the purpose of mounting, base (10) pivots via a pivot bolt (18) while opening along slit at pivot side of base (26). On the opposite side of the base (10), slit at opening side of base (24) opens to account for a wide range of trunk diameters. To secure the base (10), lockable bolt (20) transects a hole connecting to lockable bolt (22).

6 Claims, 6 Drawing Sheets

EXPANDING WEED INHIBITOR

CROSS-REFERENCE TO RELATED APPLICATIONS

Not Applicable

FEDERALLY SPONSERED RESEARCH

Not Applicable

SEQUENCE LISTING OR PROGRAM

Not Applicable

BACKGROUND OF INVENTION

1. Field of Invention

This invention prevents grass or weed growth around the base of an expanding tree or shrub via a series of overlapping, semi-circular wings.

2. Prior Art

The problem of enhancing tree growth while simultaneously curtailing grass or weed growth has been addressed in the prior art. However, the emphasis on weed control has often been at the expense of trunk expansion. For example, U.S. Pat. No. 5,396,731 to Byrne (1995) discloses a porous, preformed mulch pad with a central aperture and lockable slit. The design inherent to U.S. Pat. No. 5,396,731 could mean that as the trunk expands, the central opening of the pad could be destroyed, thus compromising the stability of the design. U.S. Pat. No. 4,268,992 to Scharf, Sr. (1981) encounters a problem similar to that of U.S. Pat. No. 5,396,731. In U.S. Pat. No. 4,268,992, damage to the tree protector caused by an expanding tree trunk is not addressed as the tree is enclosed by a hollow vertical shaft. Instead, the focus of U.S. Pat. No. 5,396,731 is the built-in water system to channel water into the subsoil. U.S. Pat. No. 3,305,969 to Mattson (1967) discloses a tree or plant protector collar, which is a prefabricated, one-piece mulching pad with a non-expandable collar and a slit from inner to outer periphery. A thin, conical weed control plate with a slit from outer to inner periphery was disclosed in U.S. Pat. No. 6,276,869 to Yakushinji (2001). As U.S. Pat. No. 6,276,869 is of solid material, held along one edge by nuts and bolts, it is not cutable to allow for an expanding trunk diameter.

To account for an expanding trunk, U.S. Pat. No. 6,705,044 to Clancey (2004) discloses an adjustable root cover which is essentially an ergonomic pad of varying shapes, made of flat, woven cloth. According to trunk size, two cords located along the inner periphery tighten the cover in opposite directions but entail refitting as the trunk expands. Another weakness of the design is that a slit extends from inner to outer periphery, inducing grass or weed growth.

Another approach was proposed by U.S. Pat. No. 5,085,001 to Crawley (1992) in which a stabilized mulch skirt with a plurality of adjustment strips may allow a customized fitting of the skirt around the trunk's diameter. There are three potential weakness in U.S. Pat. No. 5,085,001 as it is made of flexible material, has serrations to form concentric circles, as well as a slit from inner to outer periphery, all of which may breakdown and allow growth of grass or weeds. Another landscaping cover of flexible material was disclosed in U.S. Pat. No. 5,522,176 to Suttle (1996). In U.S. Pat. No. 5,522,176, concentric circular paths are defined on the material and can be cut according to size of the trunk's diameter. As with U.S. Pat. No. 5,085,001, the flexible material and slit from inner to outer periphery described in U.S. Pat. No. 5,522,176 can be broken down by studier grass or weeds. U.S. Pat. No. 5,323,557 to Sonntag (1994) discloses a landscaping mat with a flexible inner portion. As the trunk's diameter expands, the design of U.S. Pat. No. 5,323,557 can be expanded by cutting along the concentrically scored lines. Still, U.S. Pat. No. 5,323,557 faces the problem of grass or weed growth along a slit from inner to outer periphery. Another design, U.S. Pat. No. 4,308,688 to Revane (1982) discloses a tree well cover composed of two or more preformed fiberglass sections. Along the base of the design used in U.S. Pat. No. 4,308,688, concentric rings can be cut to allow for the growing tree trunk, but also faces the problem of grass or weed growth along the slits.

U.S. Pat. No. 4,648,203 to Worzek (1987) discloses a tree protector consisting of a plurality of crescent shaped flaps, hinged to each other on each side of the centerlines. The design allows for an expansion of the trunk yet also allows grass or weed growth along the centerlines where light permeates. Moreover, studier grasses or weeds can uplift one or more sides of the crescent shaped flaps, even before contact with the trunk and hereby rendering this feature useless. Finally, in the case of a non-cylindrical trunk, e.g. the formation of buttress roots, U.S. Pat. No. 4,648,203 would be uplifted unevenly, allowing undue grass or weed growth.

The design of the present invention addresses many of the problems encountered in the prior art. For example, the present invention with its series of overlapping, semi-circular wings can expand according to either a cylindrical or non-cylindrical tree trunk. As the individual wings are in close contact with the trunk, and rely on pressure from the expanding trunk diameter to move outward, grass or weeds are prevented from permeating the base. In addition, the design of the present invention allows the overlapping wings to mutually apply pressure to hold the adjacent wings downward, thus applying opposite force to upward-pressing grass or weeds. Finally, the overlapping, semi-circular wings close and cover the slit used for opening and mounting the present invention around a tree trunk, thereby eliminating the slit as a location for grass or weed growth.

BACKGROUND OF INVENTION—OBJECTS AND ADVANTAGES

It is an object of the invention to be a novel approach to the heretowith prior art, in that it substantially departs from the prior art in that the expanding tree or shrub trunk diameter applies pressure to the series of overlapping, semi-circular wings, thus inhibiting grass or weed growth while accomodating a growing tree or shrub.

Another object of the invention is to provide a grass or weed protection of the area beneath the base via the overlapping, semi-circular wings. By mutually applying pressure to adjacent wings, sunlight is thus totally blocked from from reaching the ground below the base even as the tree or shrub trunk expands. Furthermore, if grass, weeds, or tree suckers sprout below the base, the pressure-laden, overlapping design of the semi-circular wings would not allow permeation through the wings or base.

Another object of the invention is to reduce damage to the tree or shrub as direct contact with a lawnmower, trimmer, and trunk is inhibited.

Another object of the invention is to be manufactured inexpensively yet durably of weather- and UV-resistant materials including but not limited to plastic, rubber, or fiberglass with or without the addition of pigments.

Another object of the invention is to be easily mounted around the base of a tree or shrub, and may be attached to the ground by stakes permeating through the base.

Another object is that it may be locked on one side of the base but easily unlocked with a properly matching key.

Yet another object of the invention is that the slit extending from the inner to outer periphery is not a location of grass or weed growth once the invention has been mounted around a tree and the semi-circular wings have been overlapped.

These and other objects according to the invention include the ability to be manufactured in several sizes according to the varying trunk diameters of a myriad number of trees or shrubs and their respective growth habits.

Therefore, an object of the present invention is to improve on the prior art, acknowledging all of the advantages of the prior art and none of the disadvantages.

SUMMARY

In accordance with the present invention, a new and improved expanding grass or weed inhibitor which protects a tree or shrub during all growth stages due to a series of overlapping, semi-circular wings attached to the base.

DRAWINGS—FIGURES

To better understand the nature of the invention and objects other than those listed above, the annexed drawings are provided in which.

DRAWINGS—REFERENCE NUMERALS

Figure 1:
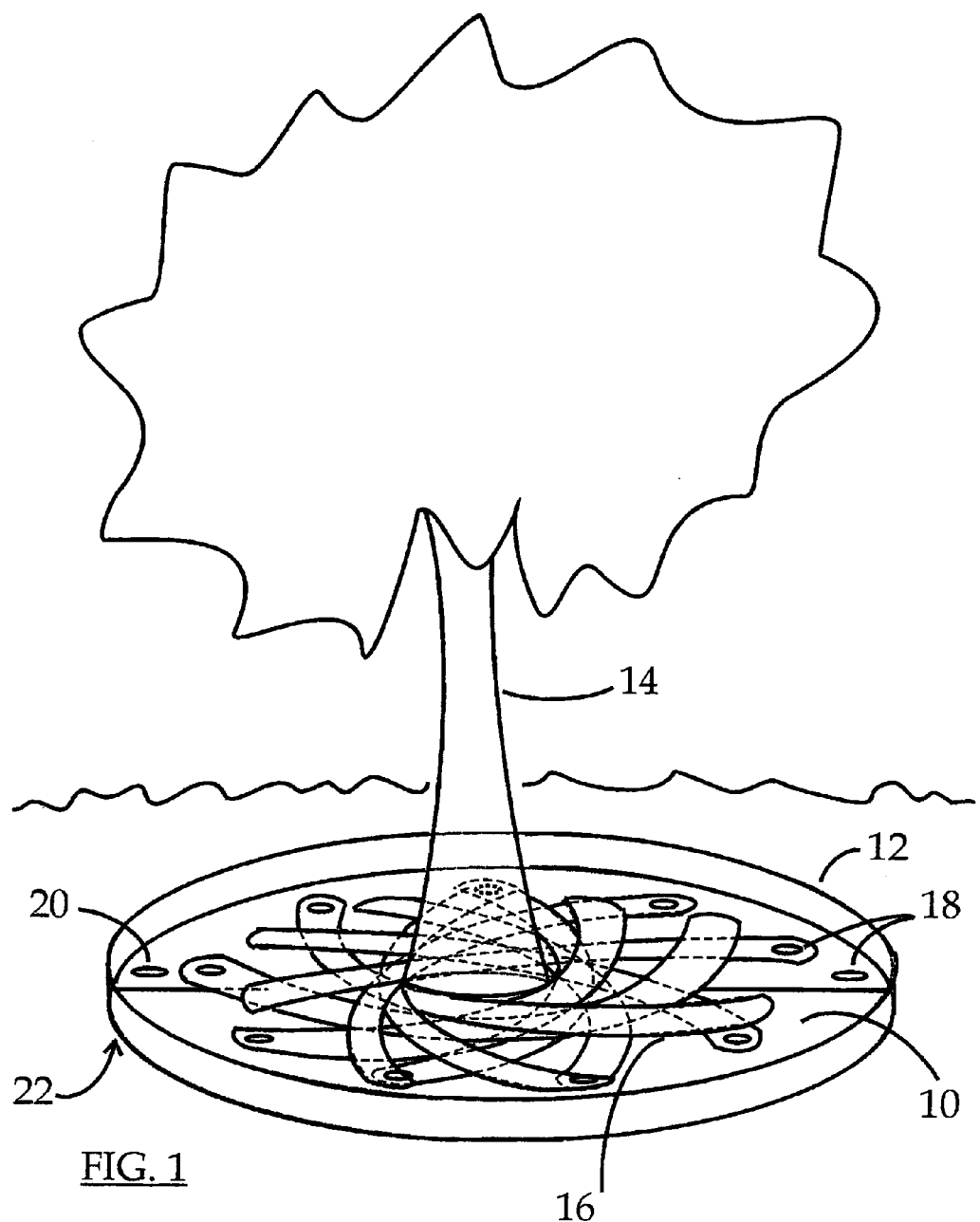
FIG. 1 is a perspective view of the present invention as used around a tree.

10 base
12 barrier wall
14 trunk
16 semi-circular wing
18 pivot bolt
20 lockable bolt
22 hole connecting to lockable bolt
24 slit at opening side of base
26 slit at pivot side of base

DESCRIPTION OF THE PREFERRED EMBODIMENT

To better understand the preferred embodiment, the following description of figures is useful.

1. Detailed Description of the Figures

In FIG. 1, the expanding weed inhibitor is shown in its entirety with multiple semi-circular wings 16 arcing around tree trunk 14 via multiple pivot bolts 18. As base 10 is in a locked position via lockable bolt 20 and hole connecting to lockable bolt 22, thus forming a perfect circle, a slit at opening side of base 24 and a slit at pivot side of base 26 are only seen as lines along base 10. In a locked position, barrier wall 12 forms a solid barrier around the perimeter of base 10.

Figure 2:
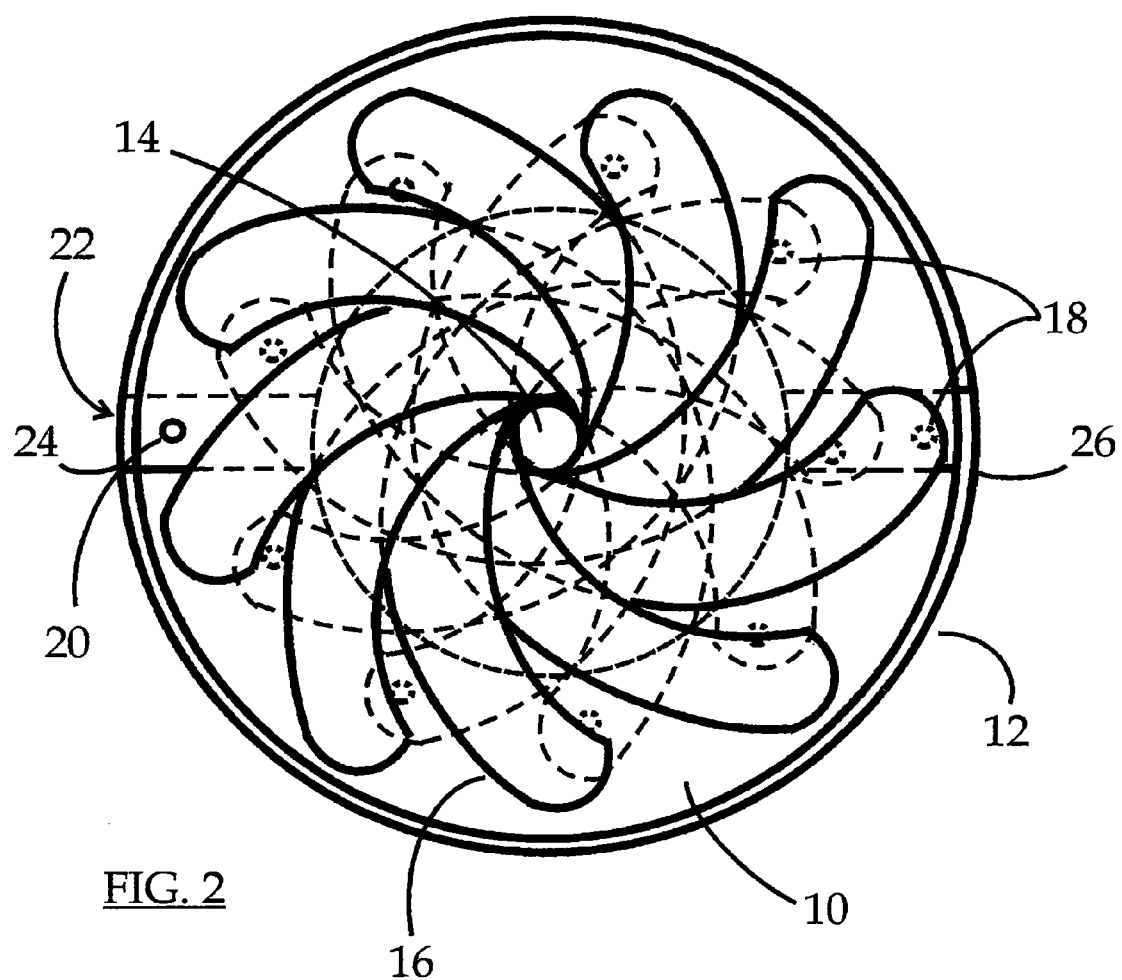
FIG. 2 is a top plan view of the present invention around a juvenile tree trunk.

In FIG. 2, a top plan view shows the present invention in a locked position with semi-circular wings 16 around a juvenile tree trunk 14. Seen more clearly in FIG. 2 is base 10 and barrier wall 12. Attached on base 10 are pivot bolts 18 from which the semi-circular wings 16 rotate. Also attached to base 10 is pivot bolt 18 which is adjacent to cut at pivot side of base 26. On the opposite side of the base, lockable bolt 20 transects hole connecting to lockable bolt 22. A slit at opening side of base 24 allows for the opening of the base.

Figure 3:
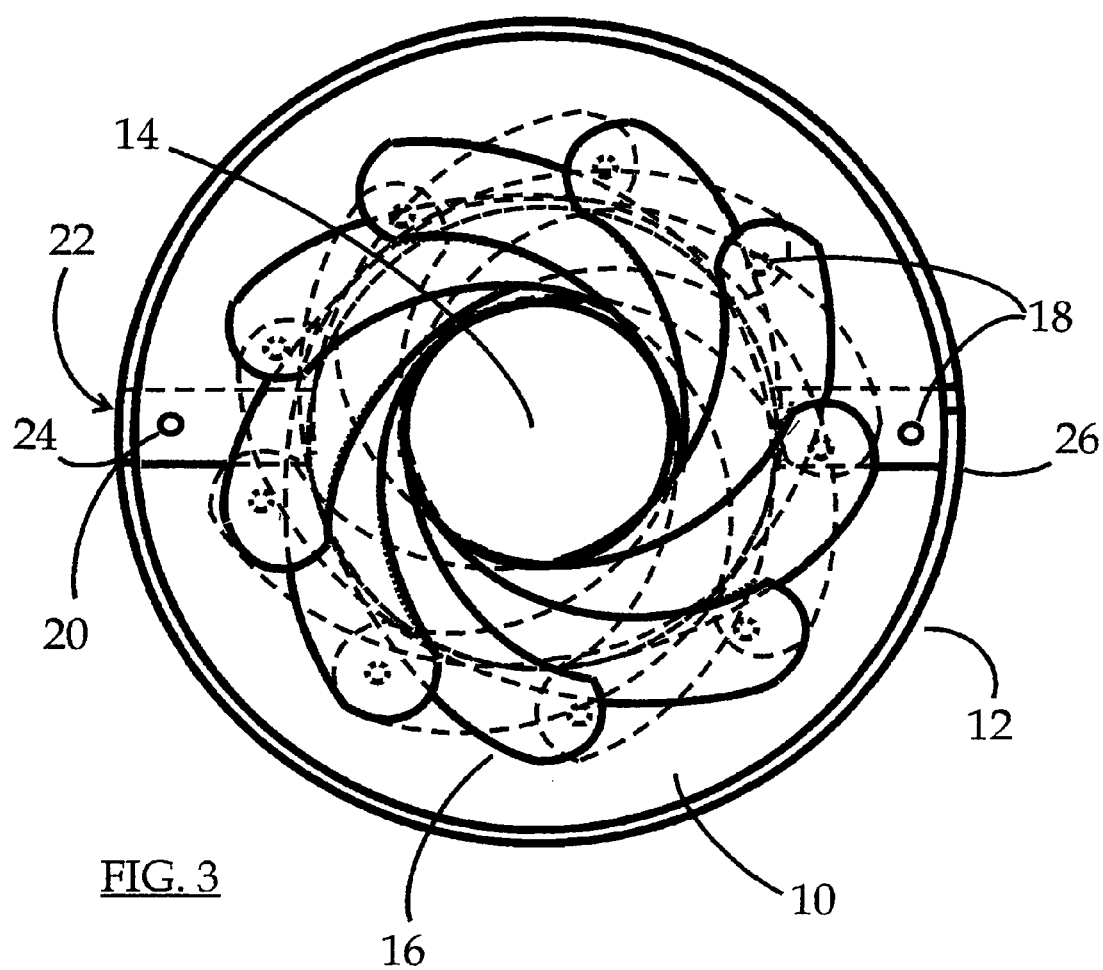
FIG. 3 is a top plan view of the present invention around a middle-aged tree trunk.

FIG. 3 shows the same part numbers as in FIG. 2 but around a middle-aged tree trunk.

Figure 4:
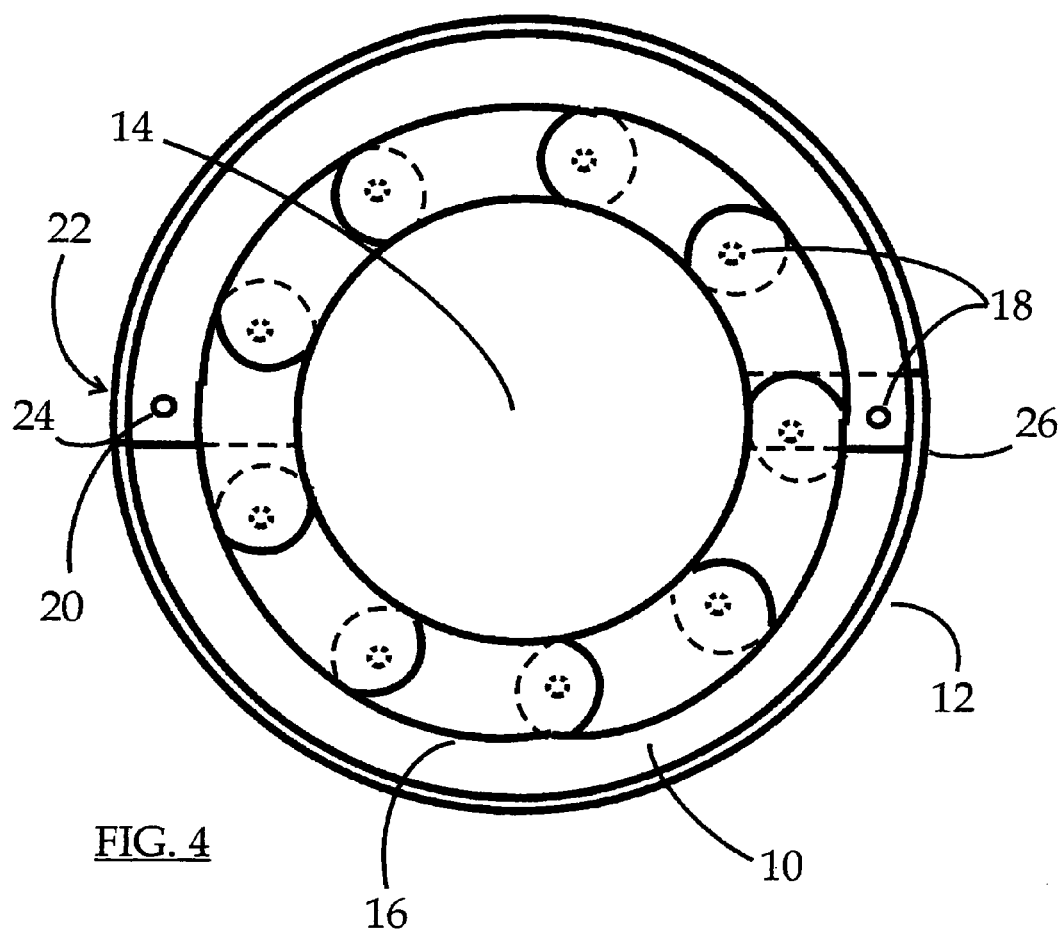
FIG. 4 is a top plan view of the present invention around a mature tree trunk.

FIG. 4 also shows the same part numbers as in FIG. 2 and FIG. 3 but around a mature tree trunk.

Figure 5:
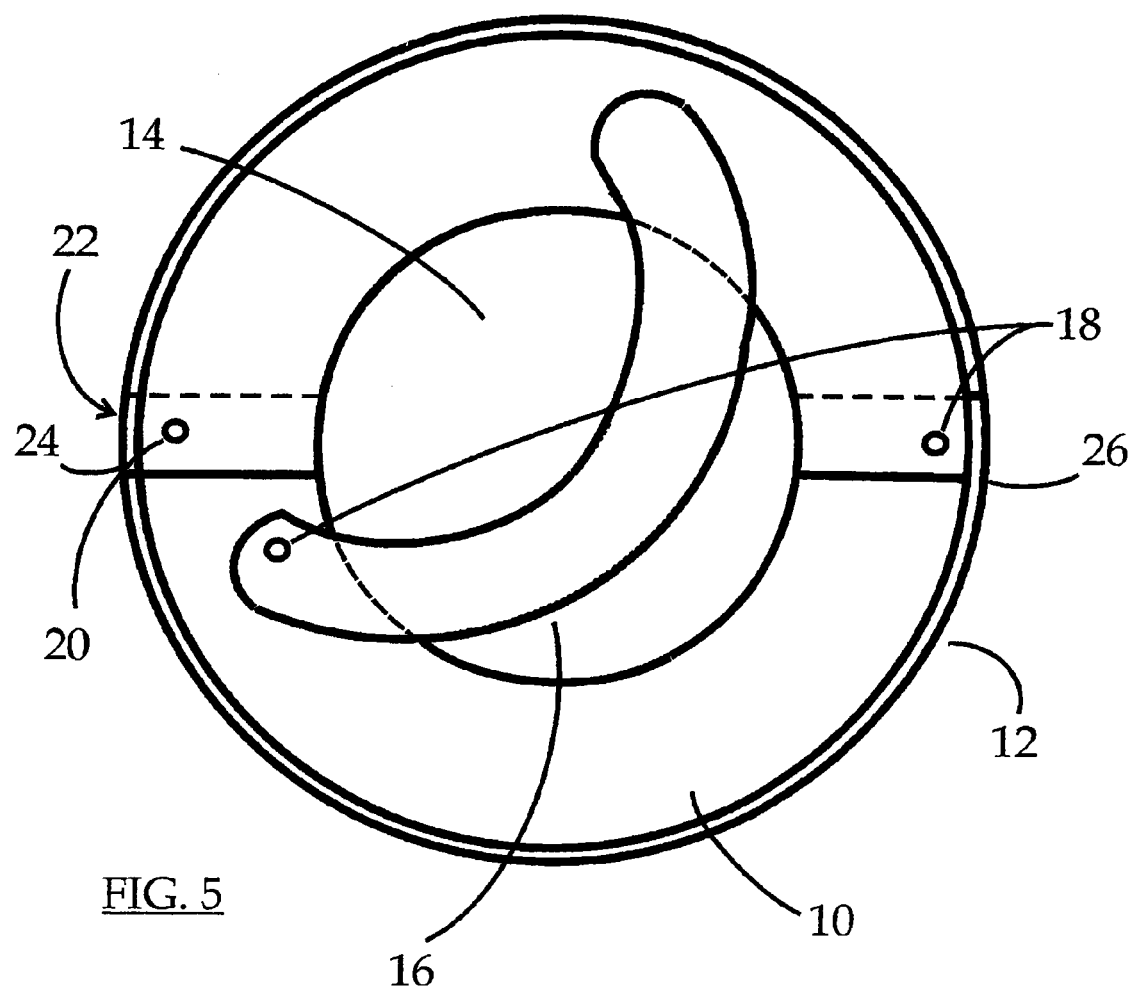
FIG. 5 is a top plan view of the present invention depicting only one semi-circular wing attached to the base.

In FIG. 5, base 10 is shown in a locked position and attached to one semi-circular wing 16 via pivot bolt 18.

Figure 6:
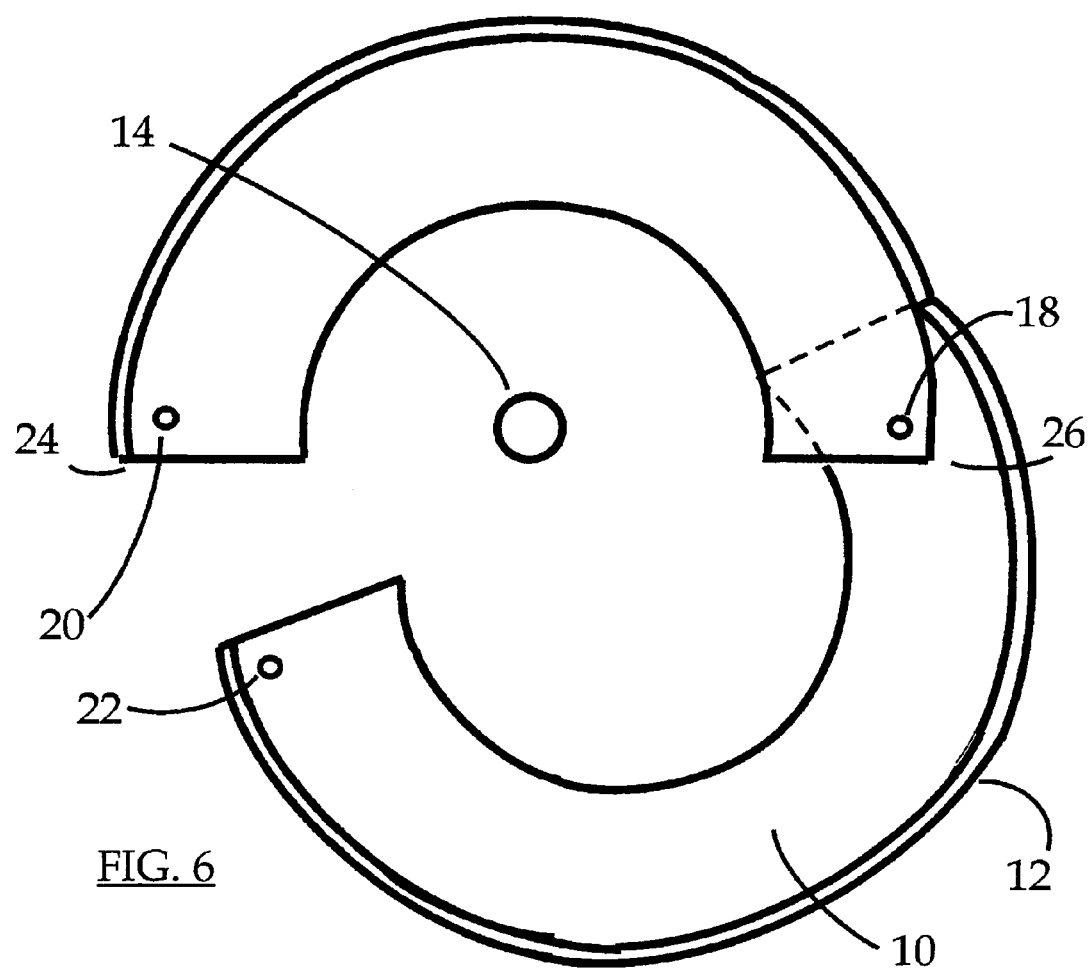
FIG. 6 is a top plan view of the present invention in an unlocked position, depicting placement around a juvenile tree trunk.

In FIG. 6, base 10 is shown in an unlocked position, depicting the positioning around a juvenile trunk 14. To pivot smoothly, slit at pivot side of base 26 is recessed on barrier wall 12 yet extends beyond the bottom side of base 10 in order to be attached via pivot bolt 18. On the opposite side of base 10, part of base 10 extends beneath slit cut at opening side of base 24 so that lockable bolt 20 can connect to hole connecting to lockable bolt 22. For sake of clarity, semi-circular wings 16 and their respective pivot bolts 18 have been omitted from FIG. 6.

I claim:

1. A weed inhibiting device for an area around the base of a tree, comprising:
   a base having an opening;
   a barrier wall surrounding the exterior of the base; and
   a plurality of overlapping semi-circular wings, each semi-circular wing having a first end and a second end, wherein each first end is pivotally connected to the base and wherein each second end is unsecured such that each semi-circular wing is configured to rotate about each pivotally connected first end.

2. The weed inhibiting device of claim 1, wherein for each semi-circular wing, the rotation of the second end is limited by the barrier wall.

3. The weed inhibiting device of claim 1, wherein the plurality of semi-circular wings form an additional opening therebetween, wherein the additional opening is smaller than the size of the opening in the base.

4. The weed inhibiting device of claim 1, wherein each semi-circular wing is configured such that a lateral expansion force exerted by a tree extending through the opening causes rotation of the semi-circular wing about its first end.

5. The weed inhibiting device of claim 1, wherein the base includes a first and a second semi-circular portion, wherein a first end of the first semi-circular portion overlaps a first end of the second semi-circular portion and a second end of the first semi-circular portion overlaps a second end of the second semi-circular portion.

6. The weed inhibiting device of claim 5, wherein the first end of the first semi-circular portion includes a first hole and the first end of the second semi-circular portion includes a second hole superimposed with the first hole, wherein a connecting device is inserted through the superimposed first and second holes to connect the first and the second semi-circular portions.

* * * * *